C. H. SEYMORE.
MILKING MACHINE.
APPLICATION FILED AUG. 14, 1908.
909,239.
Patented Jan. 12, 1909.
2 SHEETS—SHEET 1.
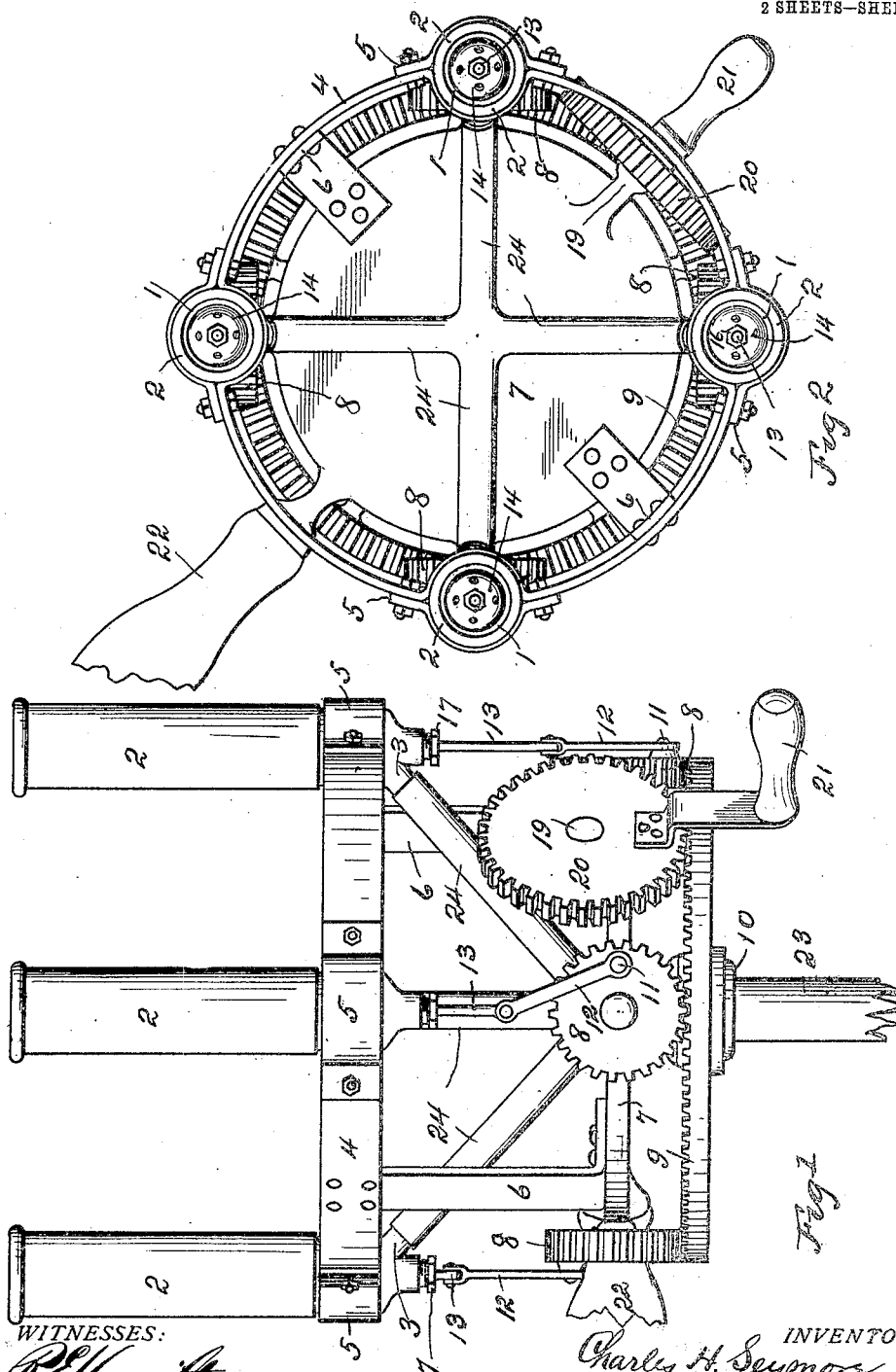

C. H. SEYMORE.
MILKING MACHINE.
APPLICATION FILED AUG. 14, 1908.
909,239.
Patented Jan. 12, 1909.
2 SHEETS—SHEET 2.
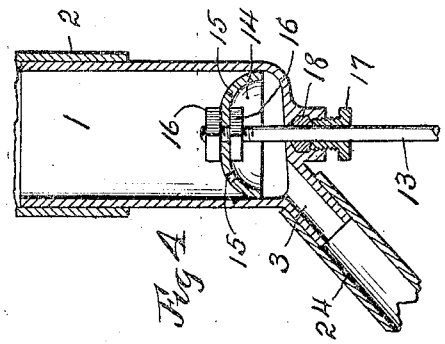
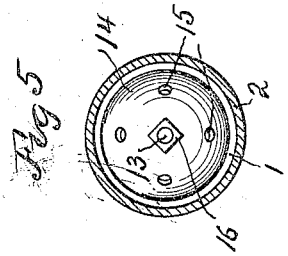
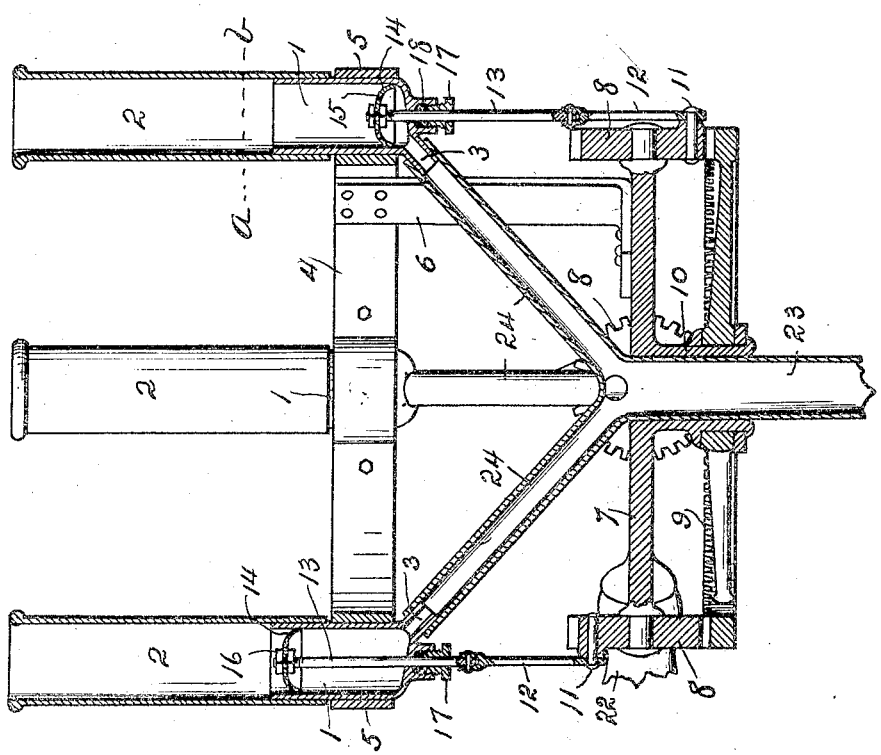
WITNESSES:
INVENTOR.
Charles H. Seymore
BY Warren D. House
His ATTORNEY.

UNITED STATES PATENT OFFICE.

CHARLES H. SEYMORE, OF KANSAS CITY, MISSOURI.

MILKING-MACHINE.

No. 909,239.　　　Specification of Letters Patent.　　　Patented Jan. 12, 1909.

Application filed August 14, 1908. Serial No. 448,534.

*To all whom it may concern:*

Be it known that I, CHARLES H. SEYMORE a citizen of the United States, residing at Kansas City, in the county of Jackson and State of Missouri, have invented certain new and useful Improvements in Milking-Machines, of which the following is a specification.

My invention relates to improvements in milking machines.

The object of my invention is to provide a milking machine which may be quickly attached to or detached from an animal and which will readily conform itself to different animals.

A further object of my invention is to provide means by which the machine may be attached to a plurality of teats and the milk drawn from the teats in consecutive order so as to simulate the action of milking by hand.

A further object of my invention is to provide an inexpensively constructed, compact and durable milking machine by means of which an animal may be quickly and cleanly milked.

Other novel features are hereinafter described and claimed.

In the accompanying drawings illustrative of my invention:—Figure 1 is a side elevation. Fig. 2 is a top view. Fig. 3 is a central vertical sectional view. Fig. 4 is a vertical sectional view enlarged of a portion of one of the cylinders and parts connected therewith. Fig. 5 is a horizontal sectional view taken on the dotted line *a—b* of Fig. 3.

Similar characters of reference denote similar parts.

1 denotes four vertical cylinders having open upper ends which serve as inlets for the milk. Each cylinder 1 at its upper or inlet end is provided with a vertical, resilient, tubular extension 2, adapted to encircle a teat of an animal and composed preferably of soft rubber. Each cylinder 1 is provided at its lower end with a downwardly and inwardly inclined tubular extension 3 which serves as an outlet for the milk. The cylinders 1 are clamped to the outer periphery of a horizontal ring 4 to which the cylinders are clamped by means of plates 5. The ring 4 is supported by two vertical standards 6 upon a horizontal flat base 7, on which are rotatively mounted on horizontal axes, four pinions 8 which mesh with a horizontal intermediate crown gear wheel 9, which is rotatively mounted on a tubular extension 10, which extends downwardly from the base 7. The pinions 8 are provided each with a crank pin 11. A plurality of links 12 are respectively pivoted at their lower ends to the crank pins 11 and their upper ends are respectively pivoted to the lower ends of four piston rods 13. Said piston rods extend respectively through the lower ends of the cylinders 1 and have respectively secured to their upper ends pistons 14, which are reciprocatively mounted, one in each cylinder 1, intermediate the inlet and outlet thereof. Each piston 14 is preferably composed of resilient material, such as soft rubber, and is preferably concavo-convex in form, the upper end being the convex end. Each piston 14 is provided with one or more small holes 15, which extend from the lower to the upper ends of the piston. By reason of the resilient material of which the pistons 14 are formed and by reason of the form of each piston and of the small size of the openings 15, said openings will be closed by the contraction of the piston when the piston moves downwardly and will open when the piston moves upwardly to permit the passage downwardly of the milk through the piston. I prefer to employ this kind of a piston to one which is provided with an ordinary valve, for the reason that milk, being of a sticky nature, will cause ordinary valve to stick and become ineffective, which is not the case with the construction which I employ.

Each piston 14 is secured to its piston rod by means of two nuts 16 which are mounted on the screw threaded upper end of the piston rod at opposite sides of the piston. The piston rods 13 may be packed where they enter the lower ends of the cylinders 1 by ordinary externally screw threaded packing rings 17, which respectively encircle the rods 13 and are respectively fitted in screw threaded recesses provided in the lower ends of the cylinders. In said screw threaded recesses is provided packing material 18, which encircles the rods 13 and is held in position by the packing rings 17. Rotatively mounted on a projection 19 which extends upwardly and outwardly from the base 7, is a spur driving gear wheel 20, which meshes with the intermediate gear wheel 9, and is provided with a crank 21 by means of which the driving gear wheel is rotated. The base 7 is provided with a laterally extending handle 22 by which the operator may support the machine with one hand while he is turning the crank 21 during the milking operation. A vertical discharge tube 23, extends through the base 7 and is fitted in the tubular extension 10. The upper end of the discharge tube 23 is provided with four upwardly and outwardly extending tubular branches 24 which are respectively fitted upon the tubular extensions 3 of the cylinders 1.

In operating my invention the resilient tubular extensions 2, are fitted over the teats of the animal to be milked, after which the driving gear wheel 20 is rotated by turning the crank 21. When the gear 20 is rotated the pinions 8 will be rotated through the intermediacy of the intermediate gear wheel 9, thus imparting reciprocation to the pistons 14 by means of the piston rods 13, links 12, and crank pins 11.

It will be noted that the crank pins 11 in the pinions 8, which are diametrically opposite each other, are disposed respectively in said pinions in diametrically opposite positions. By means of this construction two oppositely disposed pistons will be simultaneously forced in opposite directions. As the pistons move downwardly a partial vacuum will be formed in each cylinder above the piston, thus drawing the milk from the teat into the cylinder. By reason of the pistons moving simultaneously in opposite directions, the suction effect in opposite cylinders will be produced therein in consecutive order, thus simulating the operation of milking by hand.

When the pistons 14 move upwardly the milk which has entered the cylinders will pass from above the pistons to the lower ends thereof through the openings 15 and will then pass through the outlets 3 into the branches 24 from which it will pass into the tube 23. From the tube 23 the milk may be discharged into any suitable receptacle.

Various modifications of my invention within the scope of the appended claims may be made without departing from its spirit.

Having thus described my invention, what I claim and desire to secure by Letters Patent, is:—

1. In a milking machine, the combination with a hollow cylinder having an inlet and outlet for milk and provided at its inlet end with means for engaging a teat of an animal, of a resilient piston reciprocative in said cylinder and provided with one or more openings therethrough which are closed by suction when the piston moves in one direction, but which open upon the movement of the piston in the opposite direction, and means for reciprocating said piston.

2. In a milking machine, the combination with a hollow cylinder having an inlet and an outlet for milk and provided at its inlet end with means for engaging a teat of an animal, of a resilient concavo-convex piston reciprocative in said cylinder and provided with one or more openings therethrough which are closed by suction when the piston moves in one direction, but which open when the piston moves in the opposite direction, and means for reciprocating said piston.

3. In a milking machine, the combination with a plurality of hollow cylinders each having an inlet and an outlet for milk, and provided each at its inlet end with means for engaging a teat of an animal, of a plurality of pistons reciprocative in said cylinders respectively, said pistons having means by which when they are moved in one direction a partial vacuum will be formed in said cylinders at the ends of the pistons which are adjacent to the inlets of said cylinders, and means for simultaneously reciprocating said pistons.

4. In a milking machine, the combination with a hollow cylinder having an inlet at one end and an outlet at the other end, and provided at the inlet end with a resilient tubular extension for encircling a teat of an animal, of a piston reciprocative in said cylinder intermediate the inlet and outlet and provided with means by which when it is moved in one direction a partial vacuum will be formed in the cylinder at the end provided with the inlet, said piston permitting passage by it of milk when the piston is moved in the opposite direction, and means for reciprocating said piston.

5. In a milking machine, the combination with a plurality of hollow cylinders each having an inlet and an outlet and provided each at its inlet end with a tubular resilient extension for encircling the teat of an animal, of a plurality of pistons respectively reciprocative in said cylinders and having means for creating in each cylinder a partial vacuum at the inlet end of the cylinder, when the pistons are moved in one direction, but when moved in the opposite direction permitting the passage by the pistons of the milk drawn into the inlet ends of said cylinders, and means for simultaneously reciprocating said pistons.

6. In a milking machine, the combination with a support, of a cylinder mounted on said support and having means for engaging a teat of an animal, a piston reciprocative in said cylinder, a rotary device mounted on said support and provided with a crank, and means for reciprocating said piston when said device is rotated.

7. In a milking machine, the combination with a support, of a plurality of cylinders mounted on said support and having each means for engaging a teat of an animal, a plurality of pistons reciprocative respectively in said cylinders, a rotary device mounted on said support and provided with a crank, and means by which said pistons are reciprocated when said device is rotated.

8. In a milking machine, the combination with a support, of a plurality of cylinders mounted on said support and having each means for engaging a teat of an animal, a plurality of pistons reciprocative in said cylinders respectively, a plurality of pinions rotatively mounted on said support, a driving gear wheel rotatively mounted on said support and provided with a crank, an intermediate gear wheel meshing with said pinions and with said driving gear wheel, and means for reciprocating said pistons when said pinions are rotated.

9. In a milking machine, the combination with a support, of a plurality of cylinders mounted on said support and having each means for engaging a teat of an animal, a plurality of pistons reciprocative in said cylinders respectively, a plurality of pinions rotatively mounted on said support, a driving gear wheel rotatively mounted on said support and having a crank, an intermediate gear wheel meshing with said pinions and with said driving gear wheel, and links respectively connecting said pinions with said pistons by which the pistons are reciprocated when the pinions are rotated.

10. In a milking machine, the combination with a horizontal base, of a plurality of cylinders supported above said base and provided each with means for engaging a teat of an animal, a plurality of pistons respectively reciprocative in said cylinders, a discharge tube extending through said base and provided with a plurality of branches respectively connected with said cylinders, a gear wheel rotatively mounted on said base and provided with a crank, a plurality of pinions rotatively mounted on said base, means respectively connecting said pinions with said pistons for reciprocating the pistons when the pinions are rotated, and an intermediate gear wheel rotatively mounted on said base and meshing with the first named gear wheel and with said pinion.

11. In a milking machine, the combination with a support, of a plurality of cylinders mounted on said support and provided each with an inlet and an outlet and each having a resilient tubular extension at its inlet end for engaging a teat of an animal, a discharge pipe carried by said support and having branches connected respectively with the outlets of said cylinders, a plurality of pistons respectively reciprocative in said cylinders, and having means, when moved in one direction, for creating a partial vacuum in the inlet ends of said cylinders but when moved in the opposite direction, permitting passage of milk from the inlet to the outlet ends of said cylinders, a plurality of pinions rotatively mounted on said support, a driving gear wheel rotatively mounted on said support, means respectively connecting said pinions and said pistons by which the pistons are reciprocated when the pinions are rotated, and an intermediate gear wheel which meshes with said pinions and with said driving gear wheel and rotatively mounted on said support.

12. In a milking machine, the combination with a suitable support, of two cylinders mounted thereon and provided each with means for engaging a teat of an animal, two pistons respectively reciprocative in said cylinders, and means for simultaneously reciprocating said pistons in opposite directions.

13. In a milking machine, the combination with two receptacles for milk each having an inlet provided with means for engaging a teat of an animal, of means for alternately exhausting the air in said receptacles, whereby milk will be drawn into said receptacles consecutively.

14. In a milking machine, the combination with a hollow cylinder having an inlet and an outlet for milk and provided at its inlet with a resilient tubular extension for encircling a teat of an animal, of a concavo-convex resilient piston reciprocative in said cylinder intermediate said inlet and outlet and disposed with its convex end adjacent to the inlet, said piston having one or more openings therethrough which are closed by the movement of the piston toward the outlet but open when the piston moves in the opposite direction.

In testimony whereof I have signed my name to this specification in presence of two subscribing witnesses.

CHARLES H. SEYMORE.

Witnesses:
E. B. HOUSE,
J. C. IRWIN.